3,298,916
TREATMENT AND COMPOSITION FOR HIGH BLOOD PRESSURE AND PALPITATION
Sam I. Stein, 4535 Oakton Ave., Skokie, Ill. 60076
No Drawing. Filed Mar. 30, 1964, Ser. No. 355,896
4 Claims. (Cl. 167—65)

This invention relates to the treatment of hypertension and/or palpitation and it relates more particularly to a composition and method for use in the treatment of high blood pressure and/or palpitation for rapid reduction towards normalcy without undesirable or disturbing side effects. The present invention includes the treatment of neurotic symptoms especially those associated with hypertension, in a rapid and safe manner and with a minimum of disturbing side effects.

This application is a continuation-in-part of my prior copending application Serial No. 188,573, filed April 18, 1962, now United States Patent 3,150,044, patented September 22, 1964.

The treatment of high blood pressure has not heretofore been satisfactorily accomplished. Though some drugs have been found effective to lower blood pressure, the side effects are such that the major question is whether the desirability of lowering blood pressure is outweighed by the detrimental effects of the drug. This view is well summarized by the December 8, 1961, issue of "The Medical Letter," pages 1 and 2.

It has been found, in accordance with the practice of the invention described in my said prior application, that hypertension can be effectively treated by the administration of a composition containing as the essential ingredients the combination of L-tryptophan and reserpine present in the ratio of 0.05 to 1.0 gram of L-tryptophan to 0.2 to 2.0 milligrams of reserpine. When the calculations are based upon the L-tryptophan content, the supply per day to the human body ranges from 0.05 to 1.0 gram which may be supplied in dosages of 1/8 to 1/16 gram of L-tryptophan and 0.1 to 0.25 milligram of reserpine to be administered from one to eight times per day, and preferably three to four times per day.

In accordance with the practice of the present invention, the effectiveness, rapidity of action and minimization of side effects in my prior application are enhanced by the inclusion in the composition administered of a monoamine oxidase inhibitor, preferably isocarboxazid, and preferably also by the inclusion of a phenothiazine, preferably trifluoperazine.

The hypertensive syndrome is frequently accompanied by other symptom-sign complexes such as compulsive-obsessive conditions, the phobic reactions, the endogenous depressions, chronic anxiety states, the manic depressive complex and paranoic and paranoid conditions. These other symptoms including the depressed phase of the manic depressive complex and also in part the manic phase, and most of the paranoiac and paranoid conditions respond favorably in accordance with the invention along with the successful treatment of the hypertensive syndrome, e.g., the lowering of systolic and diastolic blood pressure and the elimination of palpitation. Further, allergic conditions such as hay fever, hives, hyperthermia, eczema and asthma (including status asthmaticus) are relieved by the treatment of the invention.

Reserpine has previously been used in the treatment of hypertension and palpitation. The literature includes an extensive controlled study of the effect of reserpine used by itself and with other agents in the treatment of hypertension. (See "A Double Blind Control Study of Antihypertensive Agents," prepared by the Veterans Administration Cooperative Study on Antihypertensive Agents, Washington, D.C., Archives of Internal Medicine, vol. 106, July 1960, pages 81–96.) This study reached the conclusion that reserpine alone provides no substantial beneficial effect and that there is very little effect even when reserpine is used in combination with hydralazine or with a ganglion blocking drug. In my experence, reserpine when used by itself is beneficial in some instances, but its action is not uniform and reliable.

I have found that L-tryptophan is effective to reduce blood pressure levels and palpitation in the human body, these functions of L-tryptophan not being previously known. While the effects secured by administering L-tryptophan by itself are not of the same order or speed as is achieved when L-tryptophan is used together with reserpine, L-tryptophan has some significant effect by itself and can be supplied to the human system in amounts of as much as 2 grams per day which may be broken into smaller dosages. It is preferred to limit the daily dosage to the human body of L-tryptophan to an amount within the range of 1/16—1 gram per day.

L-tryptophan degrades in the human body to form serotonin, but it forms 5-hydroxy tryptophan as an intermediate in its pathway to serotonin. The intermediate can pass the blood-brain barrier whereas serotonin cannot. Consequently, by use of L-tryptophan, the needed serotonin forms in the central nervous system where it is to produce its effect.

Accordingly, the invention in combining L-tryptophan and reserpine, combines a source of serotonin in the body (L-tryptophan) with an agent which releases serotonin (reserpine) to form a rapid and effective antitensive partnership.

It has been found that when L-tryptophan is employed in combination with reserpine, the amount of reserpine required to achieve maximum results becomes a fraction of the amounts otherwise required when using reserpine alone. Further, when reserpine is used alone, it is not as effective and may cause undesirable side effects which resemble excessive histamine, excessive serotonin in the body tissues, lethargy and tremors, possibly because of the large amount of reserpine required to achieve desirable results. Thus, it is believed that L-tryptophan and reserpine act synergistically in the combination to increase the effectiveness of reserpine and L-tryptophan thereby markedly to reduce the amount required per dosage without corresponding reduction in results thereby to make it possible to minimize or eliminate side effects requiring attention while simultaneously increasing the therapeutic value of each of the components.

Additional evidence of a desirable synergistic effect is indicated by the fact that reserpine alone does not operate to elevate diphosphyopyridine nucleotide level in the human system. However, it has been found that reserpine does enhance the effectiveness and the degree of effectiveness of the pathway which leads from L-tryptophan through niacin to diphosphopyridine nucleotide (DPN or coenzyme I) and triphosphopyridine nucleotide (TPN or coenzyme II) synthesis, both of which are often referred to as the all important energy-transport system of the body.

Many cases of relatively severe hypertension show variable degrees of endogenous depression. Monoamine oxidase inhibitors are effective to relieve depression. Unfortunately, depression is often accompanied by an agitated condition and the monoamine oxidase inhibitor used by itself is not effective to relieve the agitated, nervous or distressed condition of the patient. Usually, blood pressure and/or pulse as well as other autonomic factors remain unadjusted when monoamine oxidase inhibitors are used alone.

In the invention, it has been discovered that monoamine oxidase inhibitors provides a smoother and more complete symptomatic result when use in combination with the L-tryptophan and reserpine components and that the anti-depressant effect of the monoamine oxidase inhibitor can be achieved at much lower dosage levels than is required when it is used by itself. Moreover, the monoamine oxidase inhibitor, especially in conjunction with the phenothiazine component, minimizes side effects and no case of toxicity has been noted when all of the four components of the present invention are used together.

Various monoamine oxidase inhibitors may be used such as iproniazid, isocarboxazid, nialamid, phenelzine, β-phenylisopropyl hydrazine hydrochloride and etryptamine, and these may be used alone or in any combination. Isocarboxazid is preferred. β-phenylisopropyl hydrazine hydrochloride and iproniazid contribute a measure of toxicity and are least preferred. Nialamid should be used in higher dosage than isocarboxazid and is, therefore, least preferred. Phenelzine is adequate, but not better than isocarboxazid.

Broadly, the monoamine oxidase inhibitor may be employed in amounts of from 4–40 milligrams per day, divided into as many dosages as is considered desirable. Referring to isocarboxazid, this compound is preferably used in a dosage of from 2.5–5 milligrams administered four times per day to provide a total dosage of from 10–20 milligrams per day. The usual starting dosage, in accordance with the invention, would be 10 milligrams per day whereas, in the administration of isocarboxazid alone, the usual starting dosage is 30 milligrams per day.

In the preferred practice of the invention, a phenothiazine compound is also included in the composition which is administered to the patient. The preferred phenothiazine compound is trifluoperazine which is desirably supplied in the form of the dihydrochloride. Other phenothiazine compounds which may be used are illustrated by chlorpromazine, thioridazinehydrochloride, fluphenazine dihydrochloride and promethazine hydrochloride. Trifluoperazine has been found to be superior in its effect and is preferred for this reason.

The phenothiazine compound is included in preferred compositions because it has been found, in the combination of the invention, to still further reduce the side effects of reserpine to a negligible level. Thus, one starts with a moderately effective drug (reserpine) having occasionally, some undesirable side effects. In combination with L-tryptophan, a more reliable and powerful effect is obtained with smaller amounts of reserpine and with little side effect. In the further presence of the phenothiazine compound, the side effects of reserpine are substantially eliminated.

Generally, the phenothiazine compound is employed in an amount to provide a daily intake of from 0.5–10 milligrams divided into as many unit dosages as is desired. Preferably, four dosages are supplied daily, a suitable starting dosage containing 0.5 milligram to provide a daily intake of 2 milligrams per day and where a stronger dosage is indicated, the total daily intake would be increased to 4 milligrams per day, the foregoing having especial reference to the administration of the preferred trifluoperazine compound. In contrast, the administration of trifluoperazine by itself has been found to show an optimum but also relatively uneven response on a daily intake of 4.0–20 milligrams.

It is preferred, in accordance with the invention, to employ agents in the combination administered which will encourage the metabolic consumption by the body of the L-tryptophan component. Thus, it is preferred to include pyridoxine as a component in combination with L-tryptophan and reserpine. With the addition of pyridoxine, favorable reductions of blood pressure and pulse may be witnessed, in some instances, within 10–20 minutes after administration. The pyridoxine component is preferably provided in the form of pyridoxine hydrochloride which is water soluble and enables the daily dosages embodying the various components to be supplied to the body by oral ingestion in one or more dosages in the form of tablets, capsules, liquids or the like. Thus, pyridoxine is considered equivalent to its hydrochloride except for water solubility with its attendant advantages. Moreover, pyridoxine is partially converted within the body to pyridoxal and pyridoxamine and an equilibrium mixture of these compounds is produced by the presence of any one. Thus, pyridoxal and pyridoxamine are considered to be equivalent to pyridoxine. Further, pyridoxine, pyridoxal and pyridoxamine are all phosphated by reaction within the body and thus the scope of this invention includes the use of the phosphate esters. As a result, the term pyridoxine as employed in the specification and in the claims is intended to include pyridoxine, pyridoxal, pyridoxamine and the hydrochlorides and phosphate esters.

In practice, it desirable to supply an amount of pyridoxine corresponding to 4–40 milligrams per day. When calculated on the basis of L-tryptophan in the composition representative of the practice of this invention, such composition should be formulated to contain 4–40 milligrams of pyridoxine component per 0.05 to 1.0 gram of L-tryptophan.

To further encourage metabolic consumption by the body of the L-tryptophan component, it has been found that the composition embodying the practice of this invention can be further increased in its effectiveness by the combination to include a magnesium cation with or without the pyridoxine component, as an additional component in the treating composition. The magnesium cation is of physiologic significance an an enzyme activator. The cation plus the pyridoxal phosphate and amino acids operate in a series of reaction such as transamination, deamination and decarboxylation in the presence of enzymes. The cations chelate rapidly with adenosine triphosphate (ATP), polyphosphates, phosphoric esters, inorganic phosphate, hydroxy acids, amines, and amino acids under physiological conditions. Thus, all of the reaction partners in the ATP-dependent reactions are capable of chelation with the cation.

When employed in the composition, a source of magnesium cation in amounts up to 200 miligrams per 0.05 to 1.0 gram of L-triptophan may be employed. The source for such magnesium cations may comprise the water soluble salts, such as the chlorides, oxides, sulphates, formates, acetates, citrate, phosphates, bromides, iodides, and the like as represented by magnesium citrate, magnesium trisilicate and the like.

Relating the phenothiazine compound and the monoamine oxidase inhibitor to the L-tryptophan which is administered, for every 0.05 to 1.0 gram of L-tryptophan, 0.125 to 5.0 milligrams of phenothiazine compound should be used and 1.0 to 10.0 milligrams of monoamine oxidase inhibitor should be used.

In the following examples which are representative of formulations embodying the features of this invention for use in the treatment of high blood pressure and/or palpitation, only the essential ingredients representative of the practice of this invention are set forth in the amounts per daily requirements. It will be understood that the requirements may be broken down into smaller segments corresponding to the number of dosages per day of from one to six and preferably three to four, and that the essential components may be combined with other conventional fillers and/or carriers for formulation into capsules, pills, powders, liquids and the like for use in administration. The daily dosage might also be administered in so-called spaced, metered or long-acting preparations.

*Example 1*

L-tryptophan, grams _____ 0.05–1.0
Reserpine, milligrams _____ 0.2–2.0

Example 2

| | |
|---|---|
| L-tryptophan, grams | 0.125–0.5 |
| Reserpine, milligrams | 0.5–1.0 |

Example 3

| | |
|---|---|
| L-tryptophan, grams | 0.05–1.0 |
| Reserpine, milligrams | 0.2–2.0 |
| Pyridoxine component, milligrams | 4.0–40.0 |

Example 4

| | |
|---|---|
| L-tryptophan, grams | 0.05–1.0 |
| Reserpine, milligrams | 0.2–2.0 |
| The source of magnesium cation (magnesium oxide or molecular equivalents of other magnesium compounds), milligrams | 10.0–200.0 |

Example 5

| | |
|---|---|
| L-tryptophan, grams | 0.05–1.0 |
| Reserpine, milligrams | 0.2–2.0 |
| The source of magnesium cation, milligrams | 10.0–200.0 |
| Pyridoxine, milligrams | 4.0–40.0 |

Example 6

| | |
|---|---|
| L-tryptophan, grams | 0.5–2.0 |

Example 7

| | |
|---|---|
| L-tryptophan, grams | 0.05–2.0 |
| Source of magnesium cation, milligrams | 10.0–200.0 |

Example 8

| | |
|---|---|
| L-tryptophan, grams | 0.05–2.0 |
| Pyridoxine component, milligrams | 2.0–40.0 |

Example 9

| | |
|---|---|
| L-tryptophan, grams | 0.05–2.0 |
| Pyridoxine component, milligrams | 4.0–40.0 |
| Source of magnesium cation, milligrams | 10.0–200.0 |

In a number of instances, nutritional balance and/or the administration of an antihistamine and/or a vitamin-B complex other than pyridoxine and/or adenosine-triphosphate will be beneficial.

The preferred practice of the invention is ilustrated by the following examples:

Example 10

A preferred combination useful in the invention as an appropriate starting dosage for administration to patients not previously treated in accordance with the invention, or where a smaller effective dosage is indicated is as follows:

| | Milligrams |
|---|---|
| L-tryptophan | 67.5 |
| Reserpine | 0.1 |
| Isocarboxazid | 2.5 |
| Trifluoperazine dihydrochloride | 0.5 |

Example 11

A preferred combination which is useful after an initial period of observation with the combination of Example 10, or where a stronger dosage seems indiciated at the start of the treatment is as follows:

| | Milligrams |
|---|---|
| L-tryptophan | 125.0 |
| Reserpine | 0.25 |
| Isocarboxazid | 5.0 |
| Trifluoperazine dihydrochloride | 1.0 |

As previously indicated, Example 10 and 11 cover a unit dosage in which the listed components are preferably joined into a single medium, such as a tablet, and orally ingested by adults using from 1–6 and preferably 4 dosages per day. For children, the amounts are halved. Also, and to insure metabolic consumption of the L-tryptophan component, the patient should also take a mineral-vitamin supplement to provide appropriate proportions of pyridoxine and magnesium cation.

The subject of side effects is of sufficient importance to justify separate consideration.

Side effects arise from two sources: (a) From the lowered blood pressure; and (b) from the drugs. Previously, the process of lowering the vascular tension in an ambulatory patient had to be very slow because of the side effects such as dizziness and syncope, which might arise as a result of lowering a long standing pressure, excessively or acutely. By using the combination of Example 10 as the starting dose, no such complications are encountered. Seemingly, once the treatment is started with this combination, there appears to be a protective therapeutic mechanism operating within the situation.

Referring to the side effects resulting from the drugs, the invention is unique in that side effects are negligible.

Reserpine is well known to cause undesirable side effects and these are minimized by the use of L-tryptophan and practically eliminated by the further use of the phenothiazine agent and the monoamine oxidase inhibitor.

The side effects of the monoamine oxidase inhibitor such as blurred vision, constipation, sleeplessness, impotence, orthostatic hypertension and edema seldom occur with the exception of the latter. The edema factor clears within a week or two often without modifying the medication downwards. At the most, this edema feature is easily handled occasionally by administering a thiazide derivative for several days.

The phenothiazine component included in the preferred combinations, mainly trifluoperazine dihydrochloride, allegedly may cause a reduction in the blood cell formation, especially the white blood cells. Also it is alleged to cause a type of liver damage. Neither of these toxicities were ever encountered in a large number of cases. Interestingly, some of the cases had previously suffered from chlorpromazine liver damage. Nevertheless, when treated with the combination of the invention, there were no signs of liver toxicity even in these previously afflicted subjects.

In the doses used herein, I have never encountered a side effect that could be attributed to the L-tryptophan. In two instances, the L-tryptophan alone seemed to cause a euphoriant reaction, and in one of the two, a true excitation of 3–4 hours, something like that of the hypomanic occurred. In the same case, when a mixture was used, this euphoriant tendency did not develop. The side effect of anergy or somnolence, as can occur with reserpine, does not develop with this combination.

Other supportive measures may also be taken. In some instances there is a primary inherent or constitutional deficit in the basal metabolic rate or such a condition may develop or become manifest during treatment and the administration of desiccated thyroid would be indicated. A small amount of thryoid may also serve to bolster a very lowered physical tone. A severely debilitated patient may also be benefited by the supplemental administration for a few days or weeks of meprobamate and dexamethasone. Also, and for those from middle life on, a geriatric hormone-vitamin hematinic may be used as a supplement. However, these supportive measures are merely ancillary to the invention.

The invention is of particular importance in the treatment of neuroses, and various patients have been successfully treated including patients suffering from compulsive-obsessive states, the classical phobia, and various simpler fears and various types of paranoia. While the wide range of neuroses handled by the invention is impressive and unique, it should be stressed that the invention has not been extensively investigated with patients suffering from psychosis or dementia precox.

It is desirable to point out that the practice of this invention produces desirable results in patients who have been classified as either depressed or overexcited. The body appears to become stabilized against stresses which result in either extreme. It should be emphasized that chemical imbalance and improper body metabolism are combated in contrast to the treatment of the symptom which may prevail, that is, sedate the excited or stimulate the depressed. Treatment of the individual symptom is not precluded by the invention but frequently is unnecessary. In some forms of effective illness, the patient will shift unpredictably between mania and strong depression. The practice of this invention provides a stabilization of the physiological substrate so that mood and activity remain near average and in which pathological excursions or deviations into mania or into strong depression are minimized.

It is my conclusion that the invention achieves its results by interacting with the metabolic processes of the patient. Thus, in some instances, patients benefited by the invention have become careless with respect to their medication as is common when people live active and useful lives with a sense of well being. In other instances, I have attempted to minimize the intake of drugs and did so to too great an extent. In both of these circumstances, the patients have suffered relapses which were quickly overcome when the medication was resumed or the dosage increased. The capacity to alleviate an ailment or to cause it to re-appear at will by the presence or absence of components orally supplied strongly indicates that the cause of the ailment is metabolic (primarily biochemical rather than primarily physiological).

The invention is unique in that the only significant side effects observed are related to the individual patient and not to the drug. Thus, in treatment of a patient suffering from multiple disabilities, the most serious of which is a neurosis, the practice of this invention provides a valuable diagnostic aid since, by overcoming the neuroses, the physician is able to detect what other difficulties might exist for subsequent treatment.

A number of case histories have been established wherein persons suffering with extreme high blood pressure and pulse are reduced to about normalcy within a matter of a few days after treatment in accordance with the concepts of this invention. In each and every case, noticeable reduction in blood pressure levels and pulse can be achieved in a matter of hours of the essential administration thereby to return the sense of balance and well being to the patient almost immediately.

As will be evident from the foregoing, the compositions representative of the practice of this invention are adapted for oral administration either in the form of tablets or in the form of capsules or in the form of powders or liquids, or the various components may be administered separately in the form of such tablets, powders, liquids or capsules. It will be understood that changes may be made in the details of the formulation, administration and amounts within the areas described without departing from the spirit of the invention, especially as defined in the following claims.

I claim:

1. A method for the treatment of high blood pressure and palpitation in a patient requiring such treatment comprising the oral administration of a composition comprising L-trytophan and reserpine in an amount per day of 0.05 to 2.0 grams of L-tryptophan, and 0.2 to 2.0 milligrams of reserpine, and a monoamine oxidase inhibitor in an amount per day of 4 to 40 milligrams, and monoamine oxidase inhibitor being selected from the group consisting of iproniazid, isocarboxazid, nialamid, phenelzine, beta-phenylisopropyl hydrazine, etryptomine and hydrochlorides thereof.

2. A method for the treatment of high blood pressure and palpitation in a patient requiring such treatment comprising the oral administration of a composition comprising L-trytophan and reserpine in an amount per day of 0.5 to 2.0 grams of L-tryptophan and 0.2 to 2.0 milligrams of reserpine, a phenothiazine compound in an amount per day of 0.5 to 10 milligrams, said phenothiazine compound being selected from the group consisting of trifluoperazine, chlorpromazine, thioridazine, fluphenazine, promethazine and hydrochlorides thereof and a monoamine oxidase inhibitor in an amount per day of 4 to 40 milligrams, said monoamine oxidase inhibitor being selected from the group consisting of iproniazid, isocarboxazid, nialamid, phenelzine, beta-phenylisopropyl hydrazine, etryptamine and hydrochlorides thereof.

3. A composition for use in reducing blood pressure and pulse rate comprising L-tryptophan, reserpine and a monoamine oxidase inhibitor selected from the group consisting of iproniazid, isocarboxazid, nialamid, phenelzine, beta-phenylisopropyl hydrazine, etryptamine and hydrochlorides thereof present in the ratio of 0.2 to 2.0 milligrams of reserpine and 1.0 to 10.0 milligrams of monoamine oxidase inhibitor to 0.05 to 1.0 gram of L-tryptophan.

4. A composition for use in reducing blood pressure and pulse rate comprising L-tryptophan and reserpine in the ratio of 0.2 to 2.0 milligrams of reserpine to 0.05 to 1.0 gram of L-tryptophan, said composition further including 0.5 to 1.0 milligram of trifluoperazine and 2.5 to 5.0 milligrams of isocarboxazid.

References Cited by the Examiner

UNITED STATES PATENTS 3,150,044  9/1964  Stein _____ 167—654

OTHER REFERENCES

Physicians Desk Reference, 14th edition, 1960, page 791.

SAM ROSEN, *Primary Examiner.*

L. B. RANDALL, *Assistant Examiner.*